(12) United States Patent
Kaidar et al.

(10) Patent No.: US 8,165,153 B2
(45) Date of Patent: *Apr. 24, 2012

(54) METHOD AND APPARATUS FOR CONCURRENT OPERATION OF WIRELESS COMMUNICATION PROTOCOLS

(76) Inventors: Oren Kaidar, Binyamina (IL); Miri Ratner, Ramat-Gan (IL); Giora Rayzman, Rishon-LeZion (IL)

(*) Notice: Subject to any disclaimer, the term of this patent is extended or adjusted under 35 U.S.C. 154(b) by 1275 days.

This patent is subject to a terminal disclaimer.

(21) Appl. No.: 11/803,903

(22) Filed: May 16, 2007

(65) Prior Publication Data
US 2008/0285536 A1 Nov. 20, 2008

(51) Int. Cl.
*H04L 12/413* (2006.01)
(52) U.S. Cl. ......... 370/447; 370/395.4; 370/395.42; 370/443; 370/445; 370/448; 455/41.2; 455/63.1; 455/63.2; 455/63.3
(58) Field of Classification Search .... 455/550.1–556.1; 370/339–345
See application file for complete search history.

(56) References Cited

U.S. PATENT DOCUMENTS

| | | | |
|---|---|---|---|
| 2005/0059347 A1* | 3/2005 | Haartsen | 455/41.2 |
| 2005/0215284 A1* | 9/2005 | Su et al. | 455/556.2 |
| 2007/0098004 A1* | 5/2007 | Lada | 370/437 |
| 2008/0057967 A1* | 3/2008 | Goldsmith | 455/447 |
| 2008/0102885 A1* | 5/2008 | Tu et al. | 455/553.1 |
| 2008/0139212 A1* | 6/2008 | Chen et al. | 455/450 |

* cited by examiner

*Primary Examiner* — Dai A Phuong
(74) *Attorney, Agent, or Firm* — Cool Patent, P.C.; Joseph P. Curtin (57) ABSTRACT

A method and apparatus of coordinating operation of two or more subsystems implementing different wireless communication protocols is disclosed. The method comprises coordinating operation of a first subsystem implementing a first wireless communication protocol and at least one other subsystem implementing at least one other wireless communication protocol by merging requests from the first subsystem for pre-scheduled access and real time access into a single request for access for the first subsystem. The method comprises merging requests from the at least one other subsystem for pre-scheduled access and real time access into a single request for access for the at least one other subsystem and arbitrating between the single requests for access for each subsystem to allocate access to the first subsystem and/or the at least one other subsystem.

18 Claims, 6 Drawing Sheets

METHOD AND APPARATUS FOR CONCURRENT OPERATION OF WIRELESS COMMUNICATION PROTOCOLS

FIELD OF THE INVENTION

The present invention relates generally to concurrent operation of wireless communication protocols used by wireless communication devices. In particular, the invention relates to coordinating operation of multiple subsystems employing two or more wireless communication protocols, such as, but not limited to, WiMAX, Bluetooth and Wi-Fi.

BACKGROUND OF THE INVENTION

There is a range of wireless communication protocols in use by the subsystems of wireless communication devices, such as mobile telephones, personal digital assistants (PDAs), mobile internet devices and laptop computers. Examples of such protocols include the Institute of Electrical and Electronics Engineers (IEEE) 802.16 standard family of communication protocols, commonly referred to as WiMAX (Worldwide Interoperability for Microwave Access), Bluetooth and the IEEE 802.11 standard family commonly referred to as Wi-Fi. Two or more of the communications protocols are often in use simultaneously in a single device and between multiple devices. The subsystems of the devices may require instantaneous access to the air medium and/or access to a shared resource or may pre-schedule access ahead of time. To reduce interference between the subsystems implementing the different wireless communication protocols and thus maintain data transfer rates and avoid compromising the quality of service, such as degrading voice quality in voice calls, coexistence protocols are employed.

One existing coexistence solution is priority-based packet arbitration, which provides a real-time coexistence solution between Wi-Fi and Bluetooth, but does not include any pre-scheduling. Another known solution is schedule-based Time Division Multiple Access (TDMA), also known as Orderly TDMA (OTDMA), which utilizes pre-scheduled time reservations. Another existing solution is the mechanism of Adaptive Frequency Hopping (AFH) employed by Bluetooth, which avoids using specific frequencies to prevent subsystems implementing Wi-Fi interfering with subsystems implementing Bluetooth.

BRIEF DESCRIPTION OF THE DRAWINGS

In order that the invention may be readily understood and put into practical effect, reference now will be made to embodiments of the present invention with reference to the accompanying drawings, wherein like reference numbers refer to identical elements. The drawings are provided by way of example only, wherein.

Skilled addressees will appreciate that elements in the figures are illustrated for simplicity and clarity and have not necessarily been drawn to scale. For example, the relative dimensions of some of the elements in the figures may be distorted to help improve understanding of embodiments of the present invention.

DETAILED DESCRIPTION

Before describing embodiments that are in accordance with the present invention in detail, it should be understood that the embodiments reside primarily in combinations of method steps and apparatus components related to coordinating operation of two or more subsystems implementing different wireless communication protocols. Accordingly, the apparatus components and method steps have been represented where appropriate by conventional symbols in the drawings, showing only those specific details that are relevant to understanding the embodiments of the present invention such that the disclosure is not obscured with details that will be readily apparent to those of ordinary skill in the art.

In this specification, the terms "comprises," "comprising," "includes", "including" or any other variation thereof, are intended to cover a non-exclusive inclusion, such that a method, process, article or apparatus that comprises a list of elements does not include only those elements, but may include other elements not expressly listed or inherent to such method, process, article or apparatus. An element preceded by, for example, "comprises a . . . " does not, without more constraints, preclude the existence of additional identical elements in the method, process, article or apparatus that comprises the element It will be appreciated that embodiments of the invention herein described may be comprised of one or more conventional processors and unique stored program instructions that control the one or more processors to implement, in conjunction with certain non-processor circuits, some, most, or all of the functions of coordinating operation of two or more subsystems implementing different wireless communication protocols as herein described. The non-processor circuits may include, but are not limited to, a radio receiver, a radio transmitter, signal drivers, clock circuits, power source circuits, and user input devices. As such, these functions may be interpreted as a method for coordinating operation of two or more subsystems implementing wireless communication protocols. Alternatively, some or all functions could be implemented by a state machine that has no stored program instructions, or in one or more application specific integrated circuits (ASICs), Field-Programmable Gate Arrays (FPGAs), or other dedicated circuitry, in which each function or one or more combinations of the functions are implemented as custom logic. A combination of the two approaches could also be used. Thus, methods and means for these functions have been described herein. Further, it is expected that one of ordinary skill in the art, when guided by the disclosure herein, will be readily capable of generating such software instructions, programs and integrated circuits with minimal experimentation.

Figure 1:
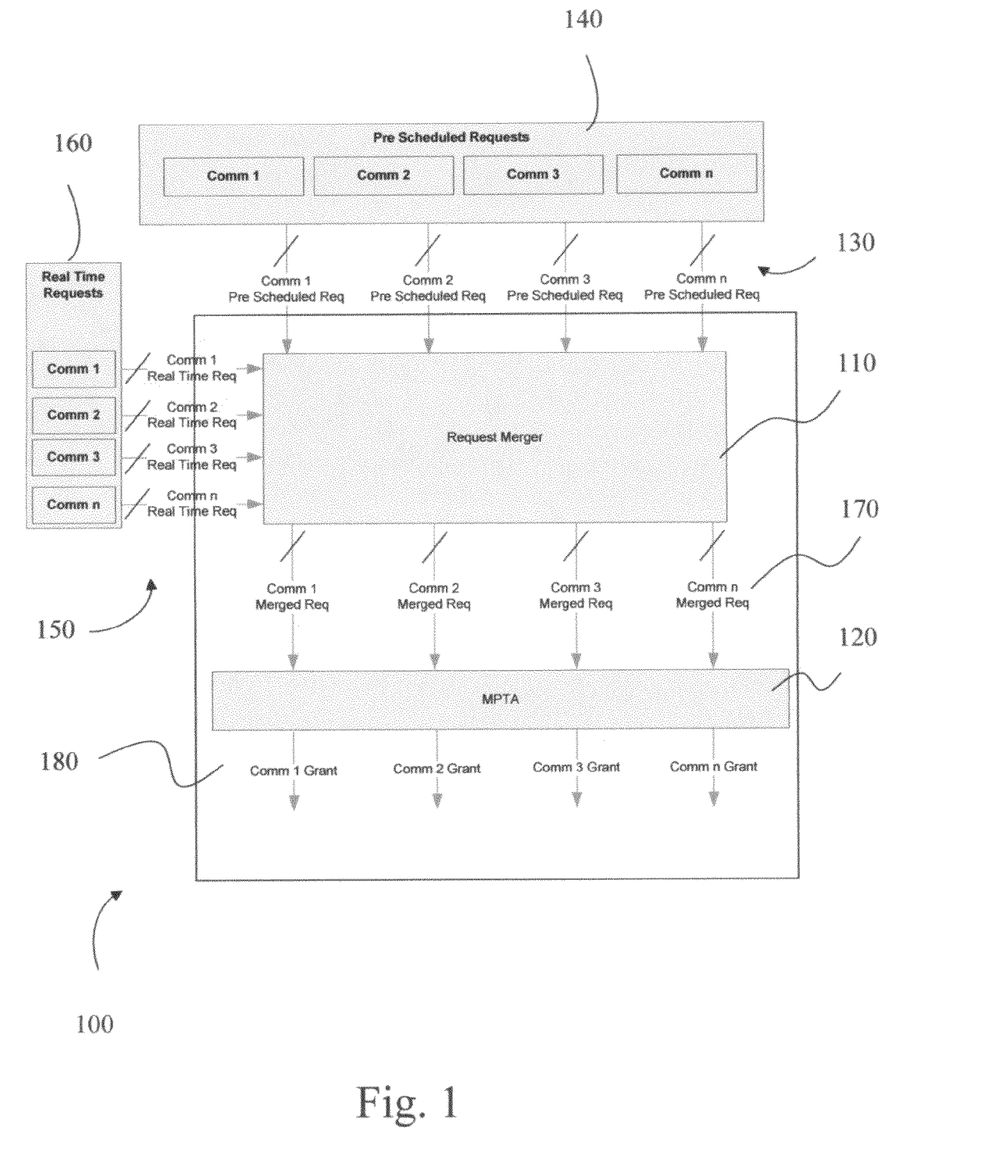
FIG. 1 is a schematic diagram illustrating an apparatus for coordinating operation of subsystems implementing different wireless communication protocols according to some embodiments of the present invention.

With reference to FIG. 1 and in accordance with embodiments of the present invention, a schematic diagram illustrates an apparatus 100 for coordinating operation of two or more subsystems implementing different wireless communication protocols. Embodiments of the present invention can be implemented in, and are applicable to, wireless communication devices, such as, but not limited to, mobile telephones, notebook or laptop computers, personal digital assistants (PDAs), portable multimedia devices, mobile internet devices (MIDs), ultra mobile PCs (UMPCs), ultra mobile devices (UMDs) and other wireless communication devices.

According to some embodiments, apparatus 100 comprises a merging module 110 in the form of a request merger coupled to be in communication with an arbitration module 120. A plurality of communication subsystems Comm 1, Comm 2, Comm 3, ..., Comm n each implement a wireless communication protocol, such as, but not limited to WiMAX, Wi-Fi, Bluetooth, radio frequencies used for navigation, such as those used in the GPS, GLONASS and Galileo navigation systems, or other third-party vendor radio protocols and the like. The communication subsystems Comm 1, Comm 2, Comm 3, ..., Comm n can be provided in a single wireless communication device or in multiple wireless communication devices such as, but not limited to, the aforementioned wireless communication devices.

Each wireless communication device can request access to air medium, and/or access to one or more shared resources, ahead of time by virtue of a stored pre-scheduled access request. When access is actually required, a request 130 is generated based on the information generated and stored by the respective communication subsystems Comm 1, ... Comm n. FIG. 1 shows a pre-scheduled access request 130 generated for each communication subsystem Comm 1, Comm 2, Comm 3, ..., Comm n.

Situations can occur in which one or more of the subsystems implement, or are capable of implementing, known coexistence solutions. Such legacy solutions are accommodated by embodiments of the present invention by the provision of transformation glue logic between one or more of the subsystems and the merging module 110. The glue logic can be implemented in the form of, for example, an ASIC, dedicated circuitry, a complex programmable logic device (CPLD) or a FPGA. Referring to FIG. 1, the transformation glue logic in this embodiment is in the form of a pre-scheduled requests complex 140. According to such embodiments, the pre-scheduled access requests 130 from the plurality of communication subsystems Comm 1, Comm 2, Comm 3, ..., Comm n are communicated via the pre-scheduled requests complex 140.

Each wireless communication device can also, or alternatively, request instantaneous access to air medium, and/or access to one or more shared resources, by virtue of a real-time access request 150. FIG. 1 shows a real-time access request 150 transmitted from each communication subsystem Comm 1, Comm 2, Comm 3, ..., Comm n.

As described above in relation to the pre-scheduled requests, in circumstances in which legacy real-time interfaces are being accommodated, such as 2-wire interfaces, IEEE 802.15.2 standard 3-wire interfaces, 4-wire interfaces or the like, transformation glue logic in the form of a real-time requests complex 160 can be provided in accordance with embodiments of the invention. According to such embodiments, the real-time access requests from the plurality of communication subsystems Comm 1, Comm 2, Comm 3, ..., Comm n, are communicated via the real-time requests complex 160.

FIG. 1 also shows a merged request signal 170 transmitted from the merging module 110 to the arbitration module 120 for each communication subsystem and a grant signal 180 transmitted from the arbitration module 120 for each communication subsystem. The grant signals 180 can pass directly to the respective subsystems or, when legacy coexistence solutions are involved, through the transformation glue logic in the form of pre-scheduled and real-time requests complexes 140, 160. This process will be described in detail hereinafter.

Figure 2:
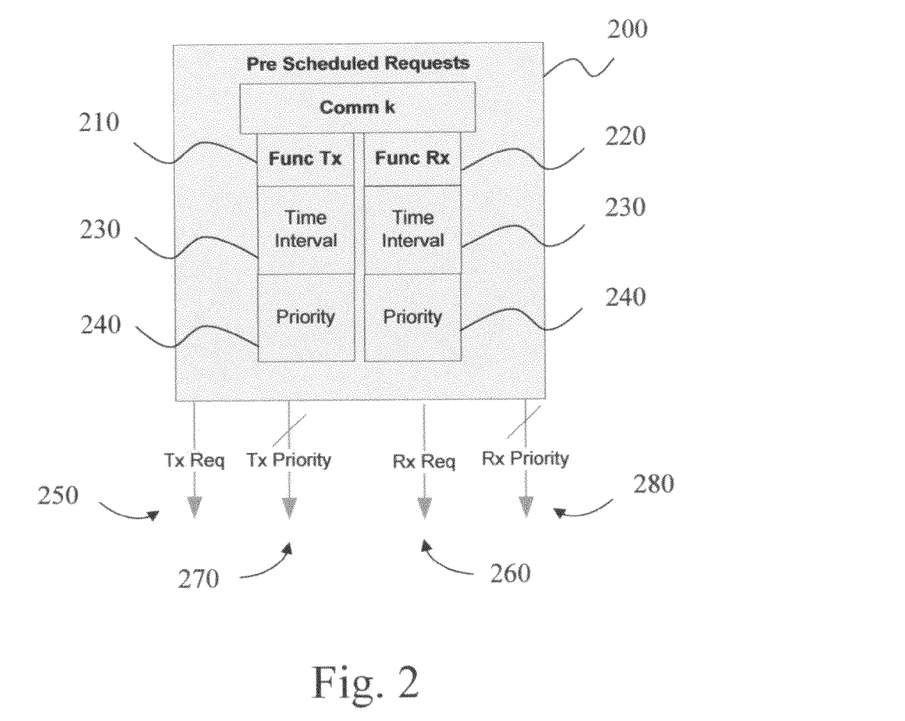
FIG. 2 is a schematic diagram illustrating a pre-scheduled request module for one of the subsystems shown in FIG. 1 according to some embodiments of the present invention.

Referring to FIG. 2, each communication subsystem Comm 1, Comm 2, Comm 3, ..., Comm n, may comprise a respective pre-scheduled request complex 200 in the form of transformation glue logic to accommodate legacy coexistence solutions. According to such embodiments, each pre-scheduled request complex 200 comprises a transmission (Tx) store 210 and a separate reception (Rx) store 220, each responsible for storing timely requests for transmission or reception respectively, allowing separate request initiation, in corresponding due time, for either transmission or reception or both. The timing information 230 is placed in the pre-scheduled request complex 200 in advance, as soon as it is known to the respective communication subsystem along with an indication of priority 240 of the request. The outputs of the pre-scheduled request complex 200 are initiated precisely on time, when access to air medium, and/or access to one or more shared resources, is actually needed. The outputs consist of two sets of signals, one for transmission and one for reception. Each transmission and reception set contains a transmission indicator 250 and a reception indicator 260 of an active request for access and its corresponding priority indicator 270, 280. In embodiments in which legacy coexistence solutions are not being accommodated, the transmission and reception indicators 250, 260 and their corresponding priority indicators 270, 280 are generated by the subsystem and the pre-scheduled request complex 200 is virtual or omitted. Pre-scheduled requests are best suited for wireless communication protocols that allow pre-coordination with the corresponding communication networks.

In the previous embodiment, the pre-scheduled requests are stored in their respective subsystems and access to the pre-scheduled requests of each subsystem are provided to the other subsystems. In alternative embodiments, the pre-scheduled requests are originally held in a store common to more than one or all subsystems to allow read access to some or all pre-scheduled requests by some or all of the subsystems Comm 1, Comm 2, Comm 3, ..., Comm n.

Figure 3:
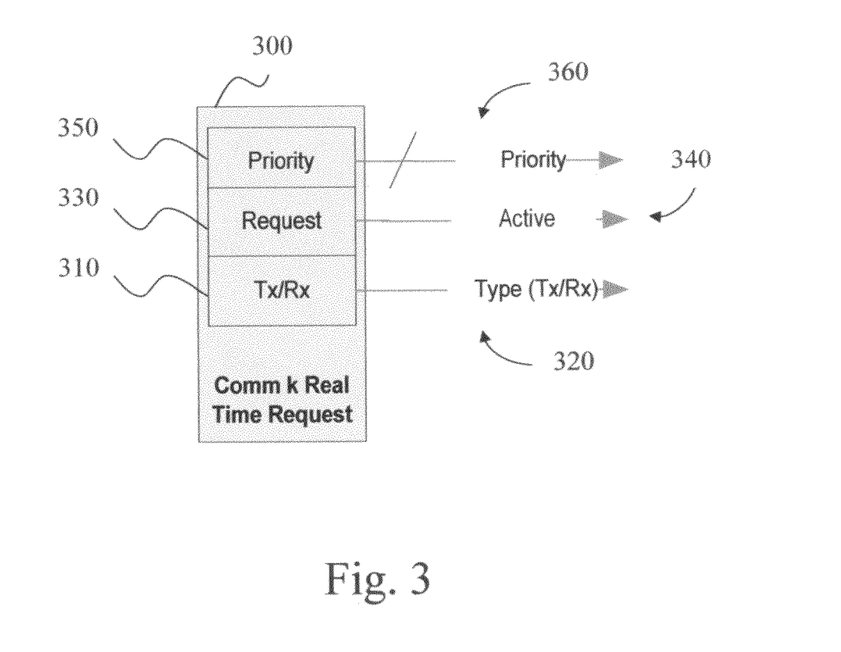
FIG. 3 is a schematic diagram illustrating a real-time request module for one of the subsystems shown in FIG. 1 according to some embodiments of the present invention.

Referring to FIG. 3, each communication subsystem Comm 1, Comm 2, Comm 3, ..., Comm n, may comprise a respective real-time request complex 300 in the form of transformation glue logic to accommodate legacy coexistence solutions. According to such embodiments, each communication subsystem comprises a combined transmission and reception module 310 for generating a type indicator 320 providing an indication of the type of real-time function being requested, i.e., a transmission (Tx) function or a reception (Rx) function, based on signaling from the subsystem. The real-time request module 300 also comprises a request generation module 330 for generating an active indicator 340 indicating the existence of the request for real-time access. The real-time request module 300 also comprises a priority generation module 350 for generating a priority indicator 360 for the request for real-time access. In embodiments in which legacy coexistence solutions are not being accommodated, the type indicator 320, active indicator 340 and priority indicator 360 are generated by the subsystem and the real-time request complex 300 is virtual or omitted. This mechanism is best suited for ad-hoc, immediate, prioritized requests signaling for media access.

Figure 4:
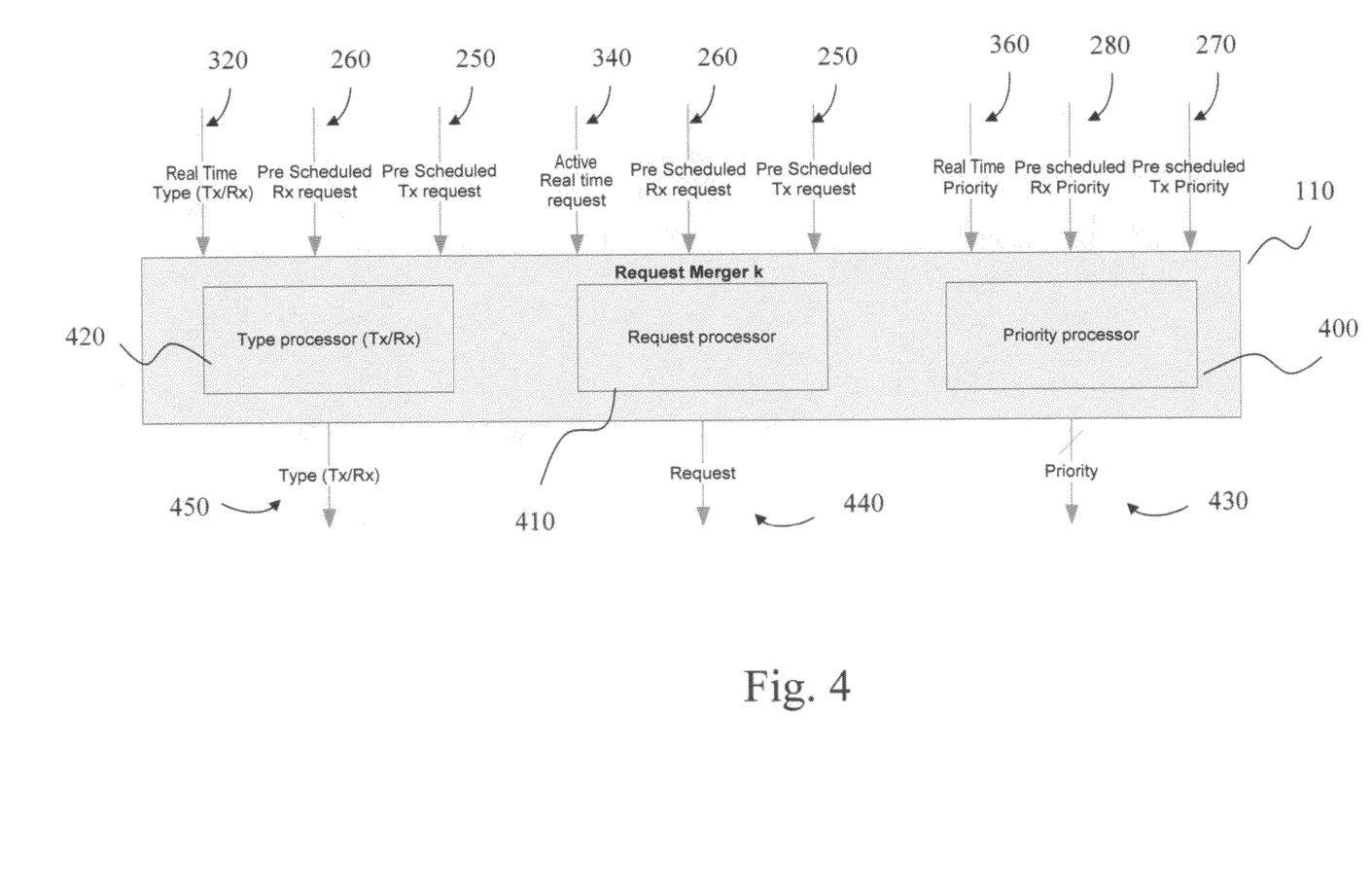
FIG. 4 is a schematic diagram illustrating a merging module of the apparatus shown in FIG. 1 according to some embodiments of the present invention.

With reference to FIG. 4, the merging module 110 comprises a priority processor 400, a request processor 410 and a type processor 420. The merging module 110 is responsible for merging the requests for pre-scheduled access and the requests for real-time access from the first, second and further communication subsystems Comm 1, Comm 2, Comm 3, ..., Comm n, into a single coherent request for access for each communication subsystem.

The priority processor 400 is responsible for merging the priority indicator 360 of the request for real-time access with at least one priority indicator of the request for pre-scheduled access to generate a single merged request priority indicator 430. According to some embodiments, such as the embodiment shown in FIG. 4, the priority processor 400 is responsible for merging the priority indicator 360 of the request for real-time access with a priority indicator 270 for a request for pre-scheduled transmission and a priority indicator 280 for a request for pre-scheduled reception.

The request processor 410 is responsible for merging an active indicator 340 of the request for real-time access with a transmission indicator 250 and/or a reception indicator 260 of a request for pre-scheduled access to generate a single merged request active indicator 440. In the embodiment shown in FIG. 4, both the transmission indicator 250 and the reception indicator 260 of the request for pre-scheduled access are shown.

The type processor 420 is responsible for merging a type indicator 320 for transmission or reception of the request for real-time access with a transmission indicator 250 and/or a reception indicator 260 of a request for pre-scheduled access to generate a single merged request type indicator 450. In the embodiment shown in FIG. 4, both the transmission indicator 250 and the reception indicator 260 of the request for pre-scheduled access are shown.

With reference to FIG. 1, the merged requests 170 are input to the arbitration module 120. The arbitration module 120 provides arbitration between the pre-scheduled and real-time requests for access from the subsystems Comm 1, Comm 2, Comm 3, ..., Comm n, competing for medium access and/or access to one or more shared resources. The arbitration process will be described in further detail hereinafter. The arbitration module 120 issues one or more simultaneous grant signals 180 to the subsystems Comm 1, Comm 2, Comm 3, ..., Comm n, to allocate access to one or more of the subsystems that are permitted to transmit or receive in the current conditions.

The first and at least one other wireless communication protocols implemented by the first and at least one other subsystems, Comm 1, Comm 2, Comm 3, ..., Comm n, can include at least two of the following wireless communication protocols: WiMAX, Wi-Fi, Bluetooth, protocols implemented in navigation systems, such as GPS, GLONASS and/or Galileo, third-party radio protocols.

The method 500 of coordinating operation of subsystems Comm 1, Comm 2, Comm 3, ..., Comm n implementing different wireless communication protocols according to some embodiments of the present invention will now be described with reference to the general flow diagram in FIG. 5. For example, embodiments of the present invention can be utilized for coordinating operation of a first subsystem Comm 1 implementing a first wireless communication protocol, such as WiMAX, and a second subsystem Comm 2 implementing a second wireless communication protocol, such as Bluetooth. Embodiments of the present invention can also be extended to third and further subsystems Comm 3, ..., Comm n implementing a third and further wireless communication protocols, such as Wi-Fi and third-party radio protocols.

Figure 5:
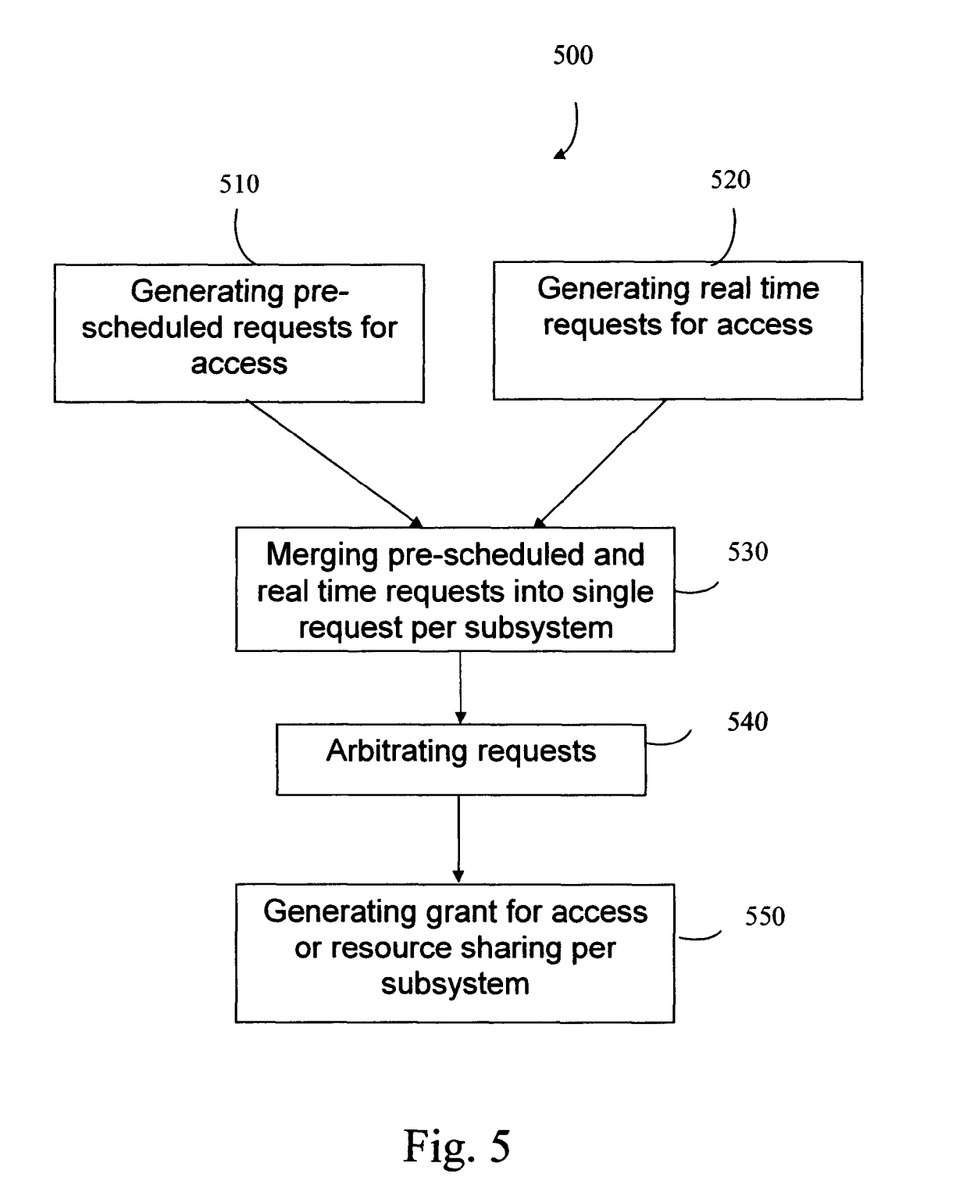
FIG. 5 is a general flow diagram illustrating a method of coordinating operation of subsystems implementing different wireless communication protocols according to some embodiments of the present invention.

Referring to FIG. 5, at 510, embodiments of the method 500 include one of the communication subsystems generating one or more requests for pre-scheduled access to air media and/or one or more shared resources. The pre-scheduled access requests can be requests for transmission, reception or both. The requests for pre-scheduled access are in the form of reservations and when the registered reservation ripens, the communication subsystem generates a corresponding active request for transmission indicator 250 and/or reception indicator 260 with the associated priority indicator 270, 280 respectively, as shown in FIG. 2.

At 520, embodiments of the method include one of the communication subsystems generating one or more requests for real-time access to air media and/or one or more shared resources. The real-time access requests are generated by the communication subsystem and can be requests for transmission or reception.

At 530, embodiments of the method 500 include the merging module 110 merging requests for pre-scheduled access and real-time access from each subsystem into a single request for access for each subsystem. For example, the method can include merging request from the first subsystem, Comm 1, for pre-scheduled access and real-time access into a single request for access for the first subsystem, Comm 1, and merging requests from the second subsystem, Comm 2, for pre-scheduled access and real-time access into a single request for access for the second subsystem, Comm 2.

At 540, embodiments of the method 500 include the arbitration module 120 arbitrating between the single coherent requests for access for each subsystem. According to some embodiments, arbitration is carried out in accordance with the method as described hereinafter with reference to FIG. 7, although other arbitration methods can be employed.

The method 500 includes at 550 allocating or denying air media access and/or access to one or more shared resources to one or more of the subsystems by generating communications accordingly for, and transmitting the communications to, each subsystem.

Figure 6:
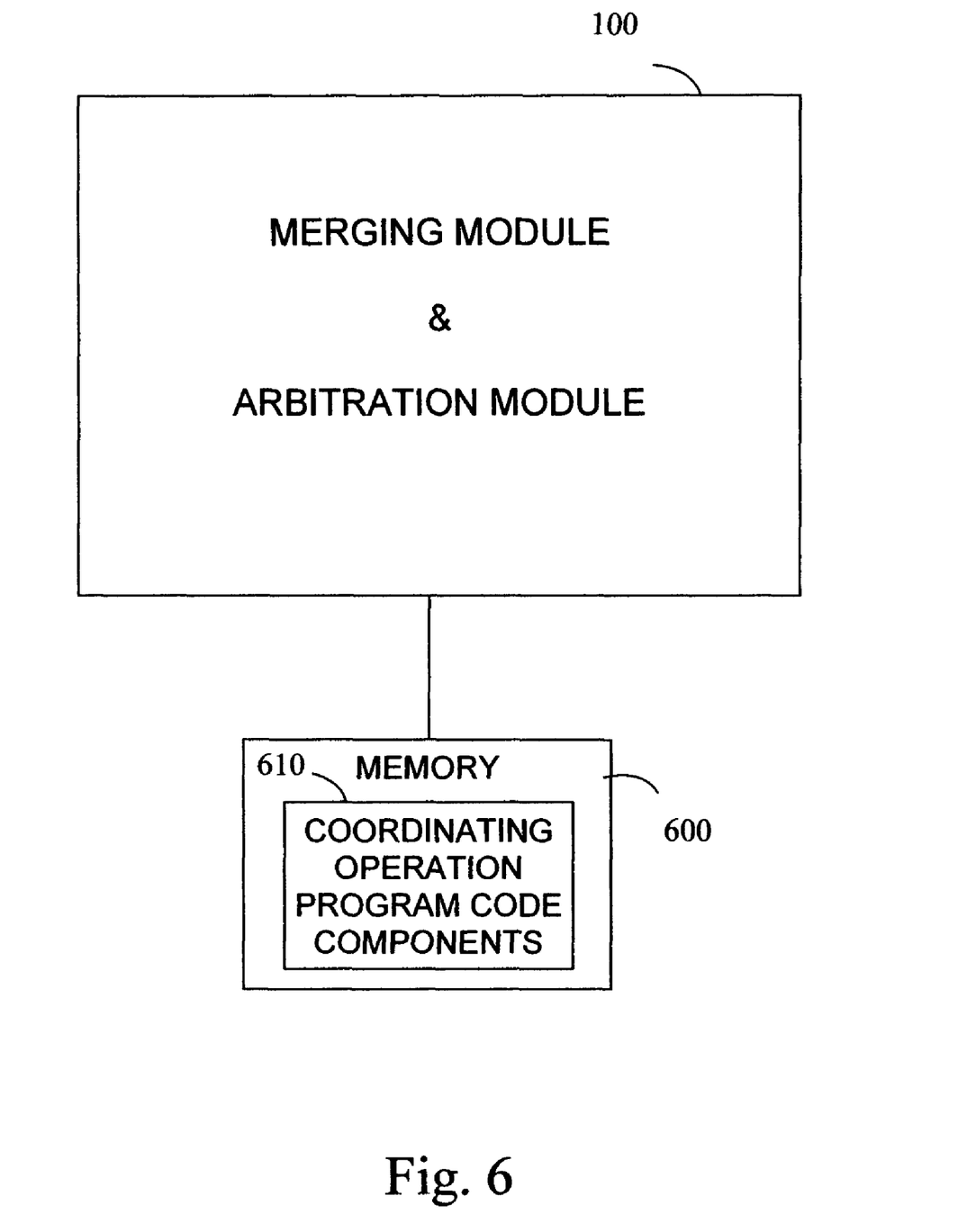
FIG. 6 is a schematic diagram illustrating further components of the apparatus shown in FIG. 1 according to some embodiments of the present invention.

Referring to FIG. 6, a schematic diagram illustrates the apparatus 100 according to some embodiments of the present invention. As described above, apparatus 100 comprises one or more processors, such as one or more standard microprocessors, ASICs, FPGAs or the like for implementing the method as described herein. In some embodiments, the apparatus 100 can be operatively coupled to a storage medium in the form of a memory 600. The memory 600 comprises a computer-readable medium, such as a random access memory (e.g., static random access memory (SRAM), or synchronous dynamic random access memory (SDRAM)), read only memory (e.g., programmable read only memory (PROM), or electrically erasable programmable read only memory (EEPROM)), or hybrid memory (e.g., FLASH), or other types of memory suitable for this type of storage, as is well known in the art. The computer-readable comprises computer-readable program code components 610 for coordinating operation between subsystems Comm 1, Comm 2, Comm 3, ..., Comm n implementing different wireless communication protocols in accordance with the teachings of the present invention, at least some of which are selectively executed by the apparatus 100 and are configured to cause the execution of the method described herein.

One method 700 of arbitration performed by the arbitration module 120 according to some embodiments of the present invention will now be described with reference to FIG. 7. At

710, the method 700 comprises receiving a merged request 170 (Fi REQ) for access to the air medium and/or access to one or more shared resources from one of the subsystems Comm 1, Comm 2, Comm 3, . . . , Comm n, via the merging module 110. The merged request 170 includes its corresponding merged type indicator 450 (transmission or reception), its corresponding merged priority indicator 430 and its corresponding merged active request indicator 440. At 720, the method 700 comprises determining or checking whether the request is active by checking that the request is asserted. If the request is not active, access will not be granted at 730.

The method further comprises at 740 determining whether a conflict exists between simultaneous requests for access by comparing the requests with a conflict identification store, such as a look-up table stored in memory. Comparison of the requests includes comparing the merged type indicators 450 of the requests from two or more subsystems. For example, simultaneous requests for reception from two or more subsystems Comm 1, Comm 2, Comm 3, ..., Comm n may be permitted in which, if granted, the granted requests would not share common resources, such as an antenna. Conversely, transmission from one subsystem implementing a first wireless communication protocol that is known to cause radio interference with reception by a second wireless communication protocol implementing a second wireless communication protocol will generate a conflict.

According to some embodiments, radio functions can be enabled or disabled in the conflict identification store. A request for a disabled function will not be considered when determining whether a conflict exists.

According to some embodiments, the conflict identification store can be configurable a priori or automatically, for example, when the device in which embodiments of the present invention are implemented moves from one country or regulatory domain to another. For example, the frequency band in which some wireless communication protocols operate differ between countries or regulatory domains. Therefore, simultaneous requests for access from subsystems implementing different wireless communication protocols may not generate a conflict in one country or regulatory domain, but may generate a conflict in another country or regulatory domain. Automatic configuration of the conflict identification store upon entering a new country or regulatory domain ensures that true conflicts are identified and that false conflicts are not erroneously identified. Furthermore, automatic configuration of the conflict identification store avoids the need for user intervention. However, user intervention can be permitted to, for example, enable the user to change configuration in accordance with the set of applications that the user wishes to use.

Figure 7:
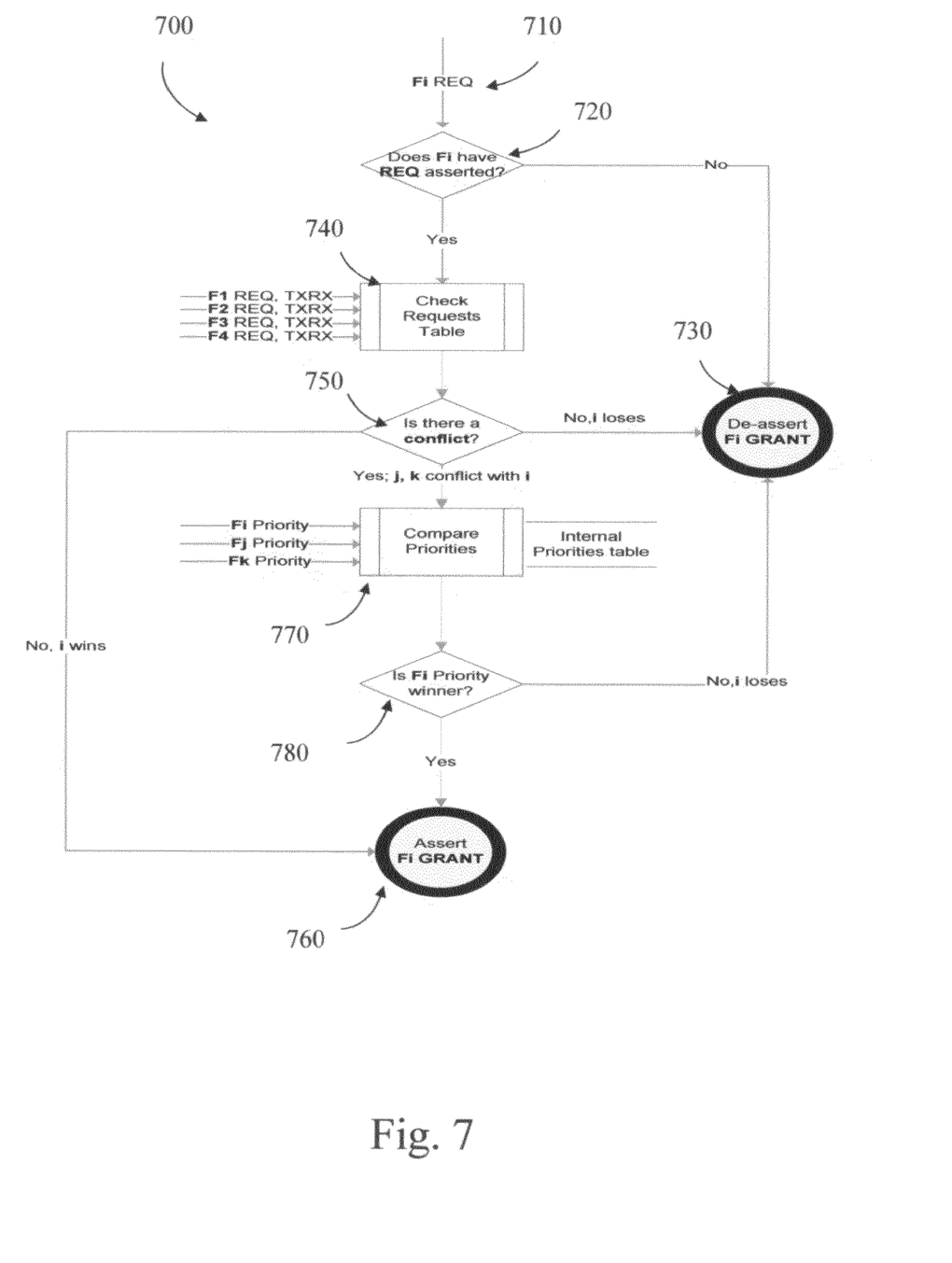
FIG. 7 is a flow diagram illustrating a method of arbitrating between requests for access according to some embodiments of the present invention.

With reference to 750 of the method in FIG. 7, when a request Fi does not generate a conflict with another request, the request can be granted at 760. Alternatively, even if there is no conflict, access may be denied at 730 if some other circumstance prevails.

Where the request Fi conflicts with one or more other requests for access, such as requests Fj and Fk in the example shown in FIG. 7, there can be one or more potential candidate subsystems to which access can be granted. In this case, the method 700 further comprises at 770 comparing the priorities of the requests Fi, Fj and Fk via the merged priority indicators 430 of each merged request. At 780, if the priority of the request Fi is the highest, the method comprises granting access at 760 to the subsystem from which the request originated via a grant signal 180. According to some embodiments, if the request Fi does not have the highest priority, access will be denied at 730.

The merged priority indicator 430 of the request can relate to the function for which access is being requested. For example, according to some embodiments, a request for access to establish a voice link can have a higher priority than a request for access to establish a data link, for example, to transfer a data file. A hierarchy of the priorities is specified in a priority store, such as a priority look-up table. The priority store can be configurable a priori or in run time.

According to some embodiments, the priority indicator 430 can relate to the wireless communication protocol implemented by the subsystem initiating the request. In this case, the method comprises comparing the merged priority indicator 430 of the merged request with a priority hierarchy for a plurality of wireless communication protocols stored in memory, for example, in a look-up table. According to some embodiments, access is granted at 760 to the request having the highest wireless communication protocol priority. For example, a hierarchy of wireless communication protocols can include third-party vendor radio technologies having a higher priority than WiMAX, which has a higher priority than Bluetooth, which in turn has a higher priority than Wi-Fi. Other hierarchies of wireless communication protocols are, of course, possible. The stored hierarchy can be configured a priori or in run time.

According to some embodiments, the priorities based on wireless communication protocols can be used for comparison as an alternative, or in addition, to the priorities based on the functions of the requests. For example, the method can further comprise granting access to the request from the subsystem implementing the wireless communication protocol highest in the hierarchy in which priorities based on the functions of the requests are equal.

According to other embodiments of the present invention, arbitration can be carried out by several pair-wise arbitrators, such as Bluetooth-Wi-Fi packet arbiters.

Once access has been granted to a subsystem at 760, the air medium and/or the one or more shared resources can be used by the subsystem until the grant signal is deactivated. If a subsystem has not yet received its own grant signal, embodiments of the method can comprise one of the subsystems acquiring access upon deactivation of the grant signal to another subsystem. The subsystem that does not have access can seize transmission or reception access or access to one or more shared resources immediately following deactivation of the grant signal to another subsystem via immediate or deferred media release, even at the expense of dropping the current transmission, burst, packet or protocol data unit (PDU).

Advantages of the various embodiments of the present invention thus include coordinating the operation of simultaneously operating subsystems Comm 1, Comm 2, Comm 3, ..., Comm n, implementing different wireless communication protocols. Consequently, interference is reduced, thus minimizing degradation of the quality of service, such as voice quality in voice calls, minimizing a reduction in data transfer rates, and maintaining access to air media and/or one or more shared resources for both real-time and pre-scheduled access requests from the subsystems. Embodiments of the present invention include merging requests from the subsystems for pre-scheduled access and real-time access into a single coherent request for access for each subsystem. The method includes arbitrating between the single requests for access for each subsystem to allocate access to the subsystems.

Embodiments of the present invention allow, and maximize the benefits of, both real-time and pre-scheduled requests for access from multiple subsystems implementing multiple wireless communication protocols, such as, but not limited to WiMAX, Wi-Fi, Bluetooth, protocols used for radio navigation systems, other third-party vendor radio technologies. For example, a Voice over Internet Protocol (VoIP) call over WiMAX can be conducted from a device whilst Bluetooth is used to connect the device to a wireless headset and data, such as images, are backed-up to the device from another Wi-Fi enabled device, such as a camera. Embodiments of the present invention provide and enable coherent resolution and simultaneous use of multiple wireless communication protocols whilst minimizing adverse effects on the wireless communication networks.

Embodiments of the present invention provide a consistent method of managing potentially overlapping requests for air medium access and/or access to one or more shared resources from multiple subsystems and enables sharing of the subsystems between some of the wireless communication protocols. Where use of the OTDMA scheme is impossible, inapplicable or entails considerable implementation difficulties, the priority based real-time mechanism is used. In some embodiments, simultaneous real-time and pre-scheduled requests can be used by the subsystems to ease the implementation.

Furthermore, embodiments of the present invention enable the addition of third-party vendor radio technologies that conventionally may interfere with one or more of the Wi-Fi, Bluetooth and/or WiMAX protocols providing a suitable interface for the third-party vendor radio technologies is implemented. In this regard, transformational glue logic in the form of the pre-scheduled requests complex 140 and the real-time requests complex 160 can be provided to interface with one or more of the subsystems implementing legacy coexistence and/or arbitration protocols.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any elements that may cause any benefit, advantage, or solution to occur or become more pronounced are not to be construed as critical, required, or essential features or elements of any or all of the claims. The invention is defined solely by the appended claims including any amendments made during the pendency of this application and all equivalents of those claims.

What is claimed:

1. A method, comprising:
    coordinating operation of a first subsystem implementing a first wireless communication protocol and at least one other subsystem implementing at least one other wireless communication protocol, the method comprising:
    merging requests from the first subsystem for pre-scheduled access and real-time access into a single request for access for the first subsystem, the requests for pre-scheduled access from the first subsystem including a transmission indicator and/or a reception indicator and the requests for real time access including a type indicator indicative of a transmission request or a reception request;
    merging requests from the at least one other subsystem for pre-scheduled access and real-time access into a single request for access for the at least one other subsystem, the requests for pre-scheduled access from the at least one other subsystem including a transmission indicator and/or a reception indicator and the requests for real time access including a type indicator indicative of a transmission request or a reception request;
    merging a type indicator of the request for real-time access from the first subsystem with a transmission indicator and/or a reception indicator of a request for pre-scheduled access to generate a single merged request type indicator for the first subsystem, or merging a type indicator of the request for real-time access from the at least one other subsystem with a transmission indicator and/or a reception indicator of a request for pre-scheduled access to generate a single merged request type indicator for the at least one other subsystem, or a combination thereof; and
    arbitrating between the single requests for access for each subsystem to allocate access to the first subsystem and/or the at least one other subsystem.

2. The method of claim 1, wherein the requests for pre-scheduled access and real-time access include a priority indicator.

3. The method of claim 1, wherein the requests for real-time access include an active indicator.

4. The method of claim 1, further comprising:
    merging a priority indicator of the request for real-time access from the first subsystem with at least one priority indicator of the request for pre-scheduled access from the first subsystem to generate a single merged request priority indicator for the first subsystem, or merging a priority indicator of the request for real-time access from the at least one other subsystem with at least one priority indicator of the request for pre-scheduled access from the at least one other subsystem to generate a single merged request priority indicator for the at least one other subsystem, or a combination thereof.

5. The method of claim 4, wherein the request for pre-scheduled access from the first subsystem comprises a priority indicator for a request for pre-scheduled transmission and a priority indicator for a request for pre-scheduled reception, or the request for pre-scheduled access from the at least one other subsystem comprises a priority indicator for a request for pre-scheduled transmission and a priority indicator for a request for pre-scheduled reception, or a combination thereof.

6. The method of claim 1, further comprising:
    merging an active indicator of the request for real-time access from the first subsystem with a transmission indicator and/or a reception indicator of a request for pre-scheduled access to generate a single merged request active indicator for the first subsystem, or merging an active indicator of the request from real-time access for the at least one other subsystem with a transmission indicator and/or a reception indicator of a request for pre-scheduled access to generate a single merged request active indicator for the at least one other subsystem, or a combination thereof.

7. The method of claim 1, wherein the first and at least one other wireless communication protocol together includes two of the following: WiMAX, Wi-Fi, Bluetooth, navigation protocols, third-party radio protocols.

8. The method of claim 1, further comprising:
    interfacing with the first subsystem and/or at least one other subsystem with glue logic in which the first subsystem and/or at least one other subsystem implement a legacy coexistence and/or arbitration protocol.

9. An article comprising: a non-transitory computer-readable medium having stored thereon instructions that, if executed, result in at least the following:

coordinating operation of a first subsystem implementing a first wireless communication protocol and at least one other subsystem implementing at least one other wireless communication protocol by merging requests from the first subsystem for pre-scheduled access and real-time access into a single request for access for the first subsystem, the requests for pre-scheduled access from the first subsystem including a transmission indicator and/or a reception indicator and the requests for real time access including a type indicator indicative of a transmission request or a reception request;

merging requests from the at least one other subsystem for pre-scheduled access and real-time-access into a single request for access for the at least one other subsystem, the requests for pre-scheduled access from the at least one other subsystem including a transmission indicator and/or a reception indicator and the requests for real time access including a type indicator indicative of a transmission request or a reception request;

merging a type indicator of the request for real-time access from the first subsystem with a transmission indicator and/or a reception indicator of a request for pre-scheduled access to generate a single merged request type indicator for the first subsystem, or merging a type indicator of the request for real-time access from the at least one other subsystem with a transmission indicator and/or a reception indicator of a request for pre-scheduled access to generate a single merged request type indicator for the at least one other subsystem, or a combination thereof;

arbitrating between the single requests for access for each subsystem to allocate access to the first subsystem and/or the at least one other subsystem.

10. The article of claim 9, wherein the requests for pre-scheduled access and real-time access include a priority indicator.

11. The article of claim 9, wherein the requests for real-time access include an active indicator.

12. The article of claim 9, further comprising merging a priority indicator of the request for real-time access from the first subsystem with at least one priority indicator of the request for pre-scheduled access to generate a single merged request priority indicator for the first subsystem, or merging a priority indicator of the request for real-time access from the at least one other subsystem with at least one priority indicator of the request for pre-scheduled access to generate a single merged request priority indicator for the at least one other subsystem, or a combination thereof.

13. The article of claim 12, wherein the request for pre-scheduled access from the first subsystem comprises a priority indicator for a request for pre-scheduled transmission and a priority indicator for a request for pre-scheduled reception, or the request for pre-scheduled access from the at least one other subsystem comprises a priority indicator for a request for pre-scheduled transmission and a priority indicator for a request for pre-scheduled reception, or a combination thereor.

14. The article of claim 9, further comprising merging an active indicator of the request for real-time access from the first subsystem with a transmission indicator and/or a reception indicator of a request for pre-scheduled access to generate a single merged active request indicator, or merging an active indicator of the request for real-time access from the at least one other subsystem with a transmission indicator and/or a reception indicator of a request for pre-scheduled access to generate a single merged active request indicator, or a combination thereof.

15. The article of claim 9, wherein the first and at least one other wireless communication protocol together includes at least two of the following: WiMAX, Wi-Fi, Bluetooth, navigation protocols, third-party radio protocols.

16. A processor to coordinate operation of a first subsystem implementing a first wireless communication protocol and at least one other subsystem implementing at least one other wireless communication protocol by:

merging requests from the first subsystem for pre-scheduled access and real-time access into a single request for access for the first subsystem, the requests for pre-scheduled access from the first subsystem including a transmission indicator and/or a reception indicator and the requests for real time access including a type indicator indicative of a transmission request or a reception request;

merging requests from the at least one other subsystem for pre-scheduled access and real-time access into a single request for access for the at least one other subsystem, the requests for pre-scheduled access from the at least one other subsystem including a transmission indicator and/or a reception indicator and the requests for real time access including a type indicator indicative of a transmission request or a reception request;

merging a type indicator of the request for real-time access from the first subsystem with a transmission indicator and/or a reception indicator of a request for pre-scheduled access to generate a single merged request type indicator for the first subsystem, or merging a type indicator of the request for real-time access from the at least one other subsystem with a transmission indicator and/or a reception indicator of a request for pre-scheduled access to generate a single merged request type indicator for the at least one other subsystem, or a combination thereof;

arbitrating between the single requests for access for each subsystem to allocate access to the first subsystem and/or the at least one other subsystem.

17. A system to coordinating operation of a first subsystem implementing a first wireless communication protocol and at least one other subsystem implementing at least one other wireless communication protocol, the system comprising:

a merging module to merge requests from the first subsystem for pre-scheduled access and real-time access into a single request for access for the first subsystem and to merge requests from the at least one other subsystem for pre-scheduled access and real-time access into a single request for access for the at least one other subsystem, the requests for pre-scheduled access from the first subsystem including a transmission indicator and/or a reception indicator and the requests for real time access including a type indicator indicative of a transmission request or a reception request, and the requests for pre-scheduled access from the at least one other subsystem including a transmission indicator and/or a reception indicator and the requests for real time access including a type indicator indicative of a transmission request or a reception request, the merging module further merging a type indicator of the request for real-time access from the first subsystem with a transmission indicator and/or a reception indicator of a request for pre-scheduled access to generate a single merged request type indicator for the first subsystem, or merging a type indicator of the request for real-time access from the at least one other subsystem with a transmission indicator and/or a reception indicator of a request for pre-scheduled access to generate a single merged request type indicator for the at least one other subsystem, or a combination thereof; and an arbitration module to receive from the merging module, and arbitrate between, the single requests for access for the first subsystem and at least one other subsystem and allocate access to the first subsystem and/or the at least one other subsystem.

18. The system of claim 17, further comprising:
glue logic coupled to be in communication with first subsystem and/or at least one other subsystem, the merging module and the arbitration module to interface with one or more legacy coexistence and/or arbitration protocols.

* * * * *

UNITED STATES PATENT AND TRADEMARK OFFICE
CERTIFICATE OF CORRECTION

PATENT NO.         : 8,165,153 B2
APPLICATION NO.    : 11/803903
DATED              : April 24, 2012
INVENTOR(S)        : Oren Kaidar et al.

Page 1 of 1

It is certified that error appears in the above-identified patent and that said Letters Patent is hereby corrected as shown below:

In column 11, line 17, in claim 9, delete "real-time-access" and insert -- real-time access --, therefor.

In column 11, line 61, in claim 13, delete "thereor." and insert -- thereof. --, therefor.

Signed and Sealed this
Tenth Day of July, 2012

David J. Kappos
*Director of the United States Patent and Trademark Office*